United States Patent [19]

Okita

[11] Patent Number: 4,710,827
[45] Date of Patent: Dec. 1, 1987

[54] SERVO APPARATUS

[75] Inventor: Masaya Okita, Yokohama, Japan

[73] Assignee: Nippon Kogaku K. K., Tokyo, Japan

[21] Appl. No.: 865,415

[22] Filed: May 21, 1986

[30] Foreign Application Priority Data

May 29, 1985 [JP] Japan .................. 60-116282

[51] Int. Cl.$^4$ ................ H04N 5/78; G11B 15/52
[52] U.S. Cl. ................ 360/10.1; 360/35.1; 360/73; 369/50
[58] Field of Search ........ 360/10.1, 35.1, 73; 358/312, 335-339, 320-322, 342; 369/50, 59, 47

[56] References Cited

U.S. PATENT DOCUMENTS

| 4,423,498 | 12/1983 | Kimura et al. | 369/59 X |
| 4,466,089 | 8/1984 | Wachi | 369/59 |
| 4,532,561 | 7/1985 | Kimura et al. | 360/73 |
| 4,546,391 | 10/1985 | Kimura | 360/10.1 X |
| 4,562,549 | 12/1985 | Tanaka et al. | 358/322 X |
| 4,575,835 | 3/1986 | Nishikawa et al. | 369/50 |
| 4,603,412 | 7/1986 | Yamazaki | 360/73 X |
| 4,611,319 | 9/1986 | Naito | 358/342 X |

FOREIGN PATENT DOCUMENTS 123946 11/1984 European Pat. Off. .......... 369/50

Primary Examiner—Aristotelis M. Psitos
Attorney, Agent, or Firm—Shapiro and Shapiro

[57] ABSTRACT

An apparatus for reproducing picture signals in conformity with revolution of a motor from a disk on which the picture signals are recorded includes separating means for successively separating horizontal synchronizing signals from the reproduced picture signals and producing separated horizontal synchronizing signals, detecting means for detecting the time intervals at which the horizontal synchronizing signals are produced by the separating means and putting out detection data indicative of the plurality of detected time intervals, memory means, means for storing in the memory means the detection data corresponding to at least one field of the picture signals, preparation means for preparing control data in accordance with the detection data stored in the memory means and storing the control data in the memory means, the preparation means preparing the control data from the detection data in accordance with a transfer function, and control means for controlling the revolution of the motor in accordance with the control data stored in the memory means.

13 Claims, 3 Drawing Figures

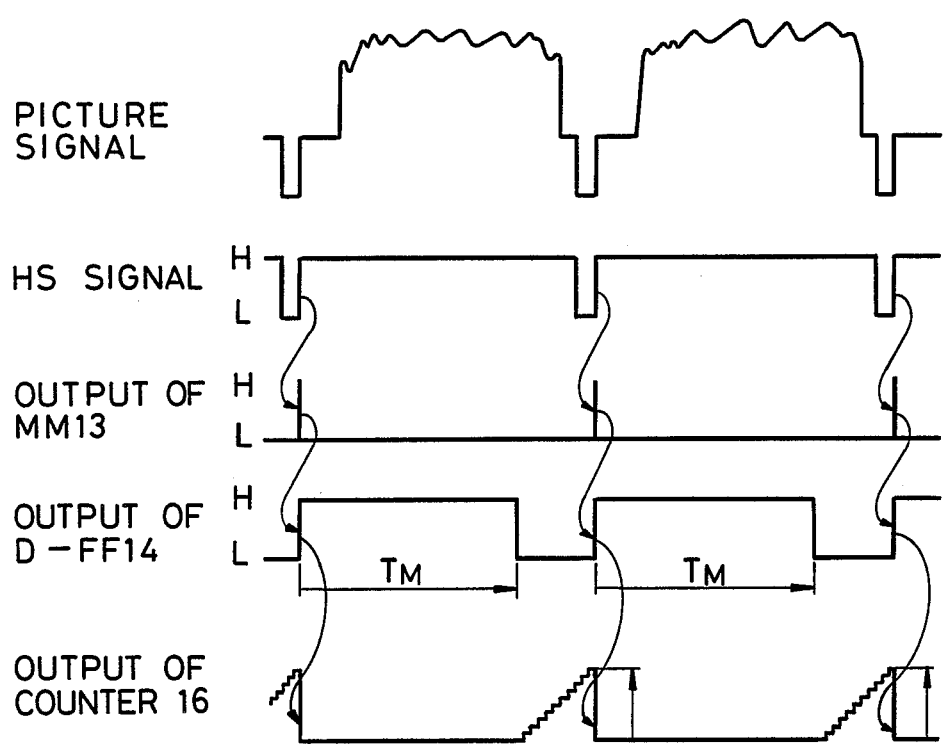

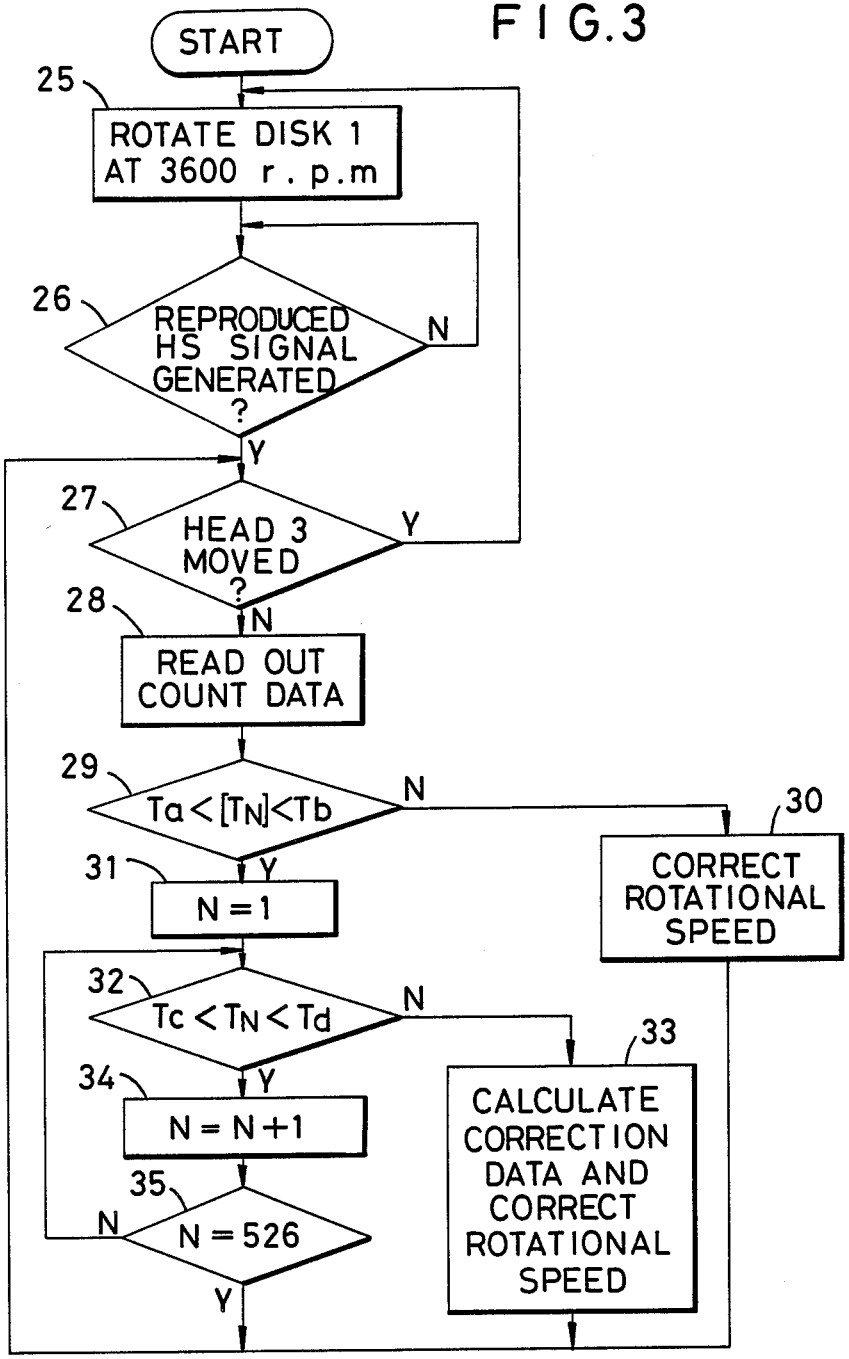

SERVO APPARATUS

BACKGROUND OF THE INVENTION

1. Field of the Invention

This invention relates to a servo apparatus for controlling the revolution of a motor so as to prevent distortion of a reproduced image resulting from irregularity of rotation in an apparatus for reproducing picture signals recorded on a magnetic disk or a magneto-optical disk.

2. Related Background Art

The standardization of video floppies for endlessly recording picture signals corresponding to one field or one frame on one track or two tracks of a magnetic disk has been made, and an electronic still camera or the like using a video floppy as a recording medium has been announced.

In an apparatus for reproducing picture signals from a magnetic disk and displaying the images on a Braun tube or printing the images on paper, it is necessary to control the revolution of a disk driving motor by the use of the vertical synchronizing signal and horizontal synchronizing signal of a reproduced picture signal in order to eliminate distortion of the reproduced image resulting from the irregularity of rotation of the disk during recording.

As prior art, there is to be found reproduction servo control of a VTR which handles the picture signal, and in which, for example, a vertical synchronizing signal (hereinafter referred to as "VS signal") and a horizontal synchronizing signal (hereinafter referred to as "HS signal") separated from the reproduced picture signal are phase-compared with a reference signal put out from a synchronizing signal generator to thereby servo-control the driving motor.

In the recording-reproducing apparatus of electronic still camera, however, picture signals corresponding to one field or picture signals corresponding to one frame are successively recorded in an endless form on one track or two tracks of a disk. During reproduction, the picture signals corresponding to one field are repetitively reproduced or the two tracks are alternately reproduced to thereby repetitively reproduce the picture signals corresponding to one frame. Thus, during reproduction, a VS signal is produced for each one full rotation of the disk irrespective of the presence of irregularity of rotation during recording. Even if servo control is applied for the phase comparison between the reproduced VS signal and the reference VS signal, the disk is only rotated at 60 HZ, i.e., 3600 r.p.m., and distortion of the reproduced image caused by the irregularity of rotation during recording which has occurred as a fluctuation of the rotational speed during one full rotation cannot be corrected.

Further, when servo control is applied with the reproduced HS signal and the reference HS signal being phase-compared, picture signals corresponding to one field or one frame are repetitively reproduced in the reproduction of the electronic still camera and therefore, the frequency of the irregularity of rotation of the reproducing signal is as high as 60 Hz for one field or 30 Hz for one frame, in the case of the NTSC system. As compared with the reproduction servo effected in the conventional VTR or the like, the frequency of the irregularity of rotation becomes very high and, when considered from the transfer function of the motor driving system, the phase delay at a high frequency is great, and distortion of the reproduced image caused by the irregularity of rotation during recording cannot be corrected by the reproduction servo heretofore effected in the conventional VTR or the like.

Also, selection of a high response frequency of the servo system has posed a problem that rotation of the disk is liable to be disturbed when noise mixes with the reproduced HS signal.

SUMMARY OF THE INVENTION

It is an object of the present invention to provide a compact and highly accurate servo apparatus for controlling a motor driven to reproduce picture signals or the like recorded on a recording medium.

To achieve the above object, the apparatus of the present invention is designed such that the interval of horizontal synchronizing signals reproduced from a medium such as a magnetic disk or a magneto-optical disk is detected, the speed distribution state including the irregularity of rotation during recording is determined, the result of this operation is stored and the driving system is controlled by an open loop with the stored speed distribution state as the control reference.

BRIEF DESCRIPTION OF THE DRAWINGS

FIG. 2 is a time chart showing the operation of a circuit portion for detecting the interval of reproduced horizontal synchronizing signals in the embodiment of FIG. 1.

FIG. 3 is a flow chart showing the control process by a microcomputer in the embodiment of FIG. 1.

DESCRIPTION OF THE PREFERRED EMBODIMENT

Figure 1:
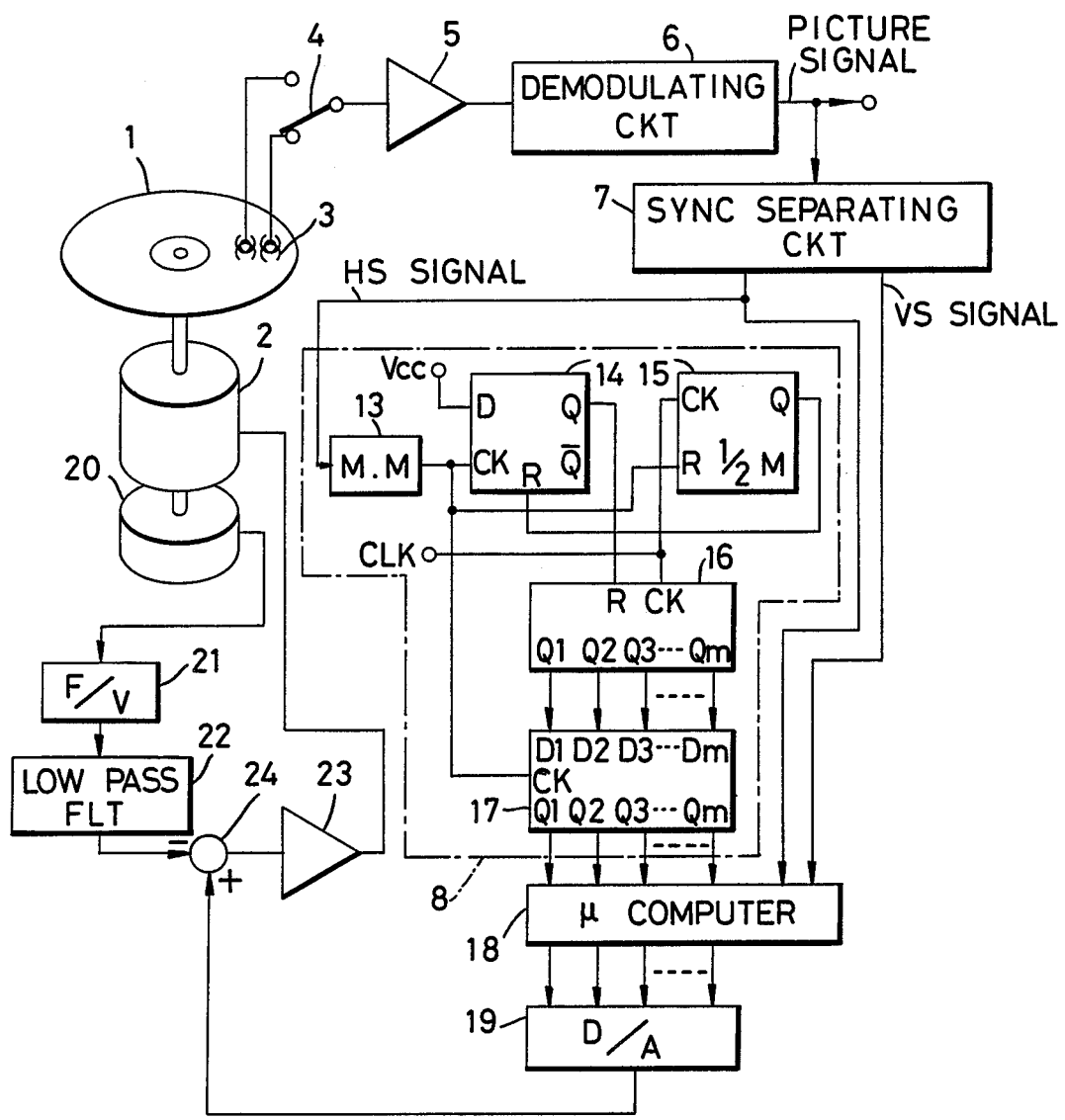
FIG. 1 is a block diagram showing a specific embodiment of the present invention.

Referring to FIG. 1, reference numeral 1 designates a magnetic disk which is rotatively driven by a disk driving motor 2. A magnetic head 3 is a two-head type in which two magnetic heads are separated from each other by a track interval and made integral with each other. Each magnetic head reproduces a picture signal corresponding to one field recorded in an endless form on the magnetic disk 1, and a switch 4 is changed over during each full rotation of the magnetic disk 1 and the picture signal corresponding to one frame is reproduced for two full rotations of the magnetic disk 1.

Reference numeral 5 denotes a reproducing amplifier, and an FM demodulating circuit 6 amplifies and demodulates the picture signal reproduced from the magnetic disk 1.

A synchronizing separating circuit 7 separates HS signal from the reproduced picture signal put out from the demodulating circuit 6. Count means 8 counts the intervals of the reproduced HS signal put out from the synchronizing separating circuit 7, by the use of a predetermined reference clock. A microcomputer 18 stores the count value of the intervals of the reproduced HS signals corresponding to one frame obtained from the counter 8, in accordance with VS signal and HS signal, determines the data for re-creating the irregularity of rotation of the magnetic disk 1 during recording, on the basis of the stored count value representative of the intervals of the reproduced HS signal, and stores the result of this operation.

A D/A converter 19, a frequency generator 20, an F/V converter 21, a low-pass filter 22 and an amplifier 23 together constitute motor control means which controls the voltage applied to the disk driving motor 2 so as to re-create the irregularity of rotation during recording, with the result of the operation of the microcomputer as control data.

The count means 8 is comprised of a monostable multivibrator (hereinafter referred to as MM) 13, a D-flip-flop (hereinafter referred to as D-FF) 14, a frequency dividing counter 15, a counter 16 and a latch circuit 17.

Operation of the count means comprised of MM 13, D-FF 14, the frequency dividing counter 15, the counter 16 and the latch circuit 17 will now be described with reference to the time chart of FIG. 2.

The reproduced picture signal put out from the demodulating circuit 6 is input to the synchronizing separating circuit 7, from which a separated HS signal is put out. MM 13 generates a pulse of very short width at the rising of the reproduced HS signal. When MM 13 generates the pulse, the pulse enters the clock input terminal CK of D-FF 14, and the output Q of D-FF 14 rises to H level. At the same time, the H level output of MM 13 is also input to the reset input terminal R of the frequency dividing counter 15, and the frequency dividing counter 15 is reset. When M clock pulses CLK are input to the frequency dividing counter 15 after the frequency dividing counter 15 has been reset, the output Q assumes H level and D-FF 14 is reset. The clock pulses CLK are generated at a predetermined period in accordance with a crystal oscillator or the like.

Accordingly, the output Q of D-FF 14 assumes H level at the rising of the output pulse of MM 13 and, when M clock pulses enter the frequency dividing counter 15 thereafter, D-FF 14 is reset by the H level output of the frequency dividing counter 15 and the output Q falls to L level. Since the output Q of D-FF 14 is imparted to the reset input terminal R of the counter 16, the counter 16 starts to count the clock pulses CLK (after M clock pulses have entered the frequency dividing counter 15). This is a contrivance for making the number of bits of the counter not great. The counter 16 produces a counter output which increases as shown at the digital step in FIG. 2. The height of this digital step represents the counter output. $T_M$ in FIG. 2 is a period of time corresponding to M pulses CLK.

The count output of this counter 16 is latched by the latch circuit 17 at the rising of the output pulse of MM 13.

The time when the counter 16 is reset is a little later than the time when the output pulse of MM 13 rises and therefore, the latch circuit 17 puts out to the microcomputer 18 a count value corresponding to the number of clock pulses CLK generated during the period of time from the rising of the output pulse of MM 13 till the next rising of the output pulse, minus the number M. Thus, a value obtained by counting the intervals of the reproduced HS signal by the use of a predetermined clock pulse is input to the microcomputer 18.

Operation of motor control means comprising a D/A converter 19, a frequency generator (hereinafter referred to as FG) 20, an F/V converter 21, a low-pass filter 22 and a power amplifier 23 as shown in FIG. 1 will now be described.

FG 20 generates a pulse signal of a frequency corresponding to the rotational speed of the disk driving motor 2, the pulse frequency is converted into a voltage by the F/V converter 21, and a voltage corresponding to the rotational speed of the disk driving motor 2 is obtained. The difference between the voltage corresponding to the rotational speed from the F/V converter 21 and the voltage put out from the D/A converter 19 which provides a control reference is found at an addition point 24 through the low-pass filter 2, and the disk driving motor 2 is feedback-controlled through the power amplifier 23.

Accordingly, if the output voltage of the D/A converter 19 is constant, the disk driving motor 2 will be controlled to a constant speed independently of the load.

On the other hand, if there is an AC component in the output of the D/A converter 19, a control voltage of the same frequency is applied to the disk driving motor 2 through the power amplifier 23, and when the frequency of the applied voltage is low, the output of the F/V converter 21 is controlled by a speed control loop so as to assume the same AC wave form as the output of the D/A converter 19, and as the frequency thereof becomes higher, the rate of variation in speed to the amplitude of the AC component of the D/A converter 19 becomes smaller and a phase delay appears in the output voltage of the F/V converter 21.

If the transfer function in accordance with the output from the microcomputer 18 to the D/A converter 19 and in accordance with the interval of the horizontal synchronizing signal of the picture signal representing in said output, i.e., the input from the counter 8 to the microcomputer 18, is known, it will be possible to create any irregularity of rotation by the output of the D/A converter 19. Accordingly, at step 33 in FIG. 3 which will be described later, the result of dividing the counted intervals of the reproduced HS signal by the transfer function is input as control data to the motor control means, whereby the same irregularity of rotation as that during recording is created.

FIG. 3 is a flow chart showing a control process for controlling the disc driving motor so as to re-create the irregularity of rotation during recording by the microcomputer 18 of FIG. 1.

First, at step 25, the microcomputer 18 causes a predetermined voltage for rotating the magnetic disk 1 at a constant speed of 3600 r.p.m. to be put out from the D/A converter 19. Subsequently, at step 26, whether the reproduced HS signal is being put out from the synchronizing separating circuit 7 is checked and, if the reproduced HS signal is being put out, the program proceeds to step 27. At step 27, whether the head 3 has been moved to the next track is judged and, if the head 3 has been moved, the program returns to step 25 and the magnetic disk 1 is rotated at a constant speed of 3600 r.p.m, and if the head 3 has not been moved, the program proceeds to the next step 28.

At step 28, count data corresponding to one frame of the reproduced picture signal are successively introduced from the latch circuit 17, and a period of time corresponding, to M clock pulses is added to each count data and the sum is stored as TN(N=1-525) in the internal memory. In this case, if the count data is read from the latch circuit for a period of time corresponding to several fields and the average value of each interval of each reproduced HS signal is found, the reliability and accuracy can be further improved.

At step 29, the average value [TN] of 525 horizontal synchronizing periods TN which provide one frame of the reproduced picture signal is calculated in accordance with the count data stored in the internal memory, and this average value is stored in the internal memory and whether the stored average value is within the range of predetermined reference values Ta and Tb is checked. The horizontal synchronizing period corresponds to the interval of the HS signal.

When the stored average value is within a range greater than the reference value Ta and less than the reference value Tb, the program proceeds to step 31, and when the stored average value is outside said range, at step 30, the output of the D/A converter 19 is increased or decreased by an amount corresponding to the difference between To which is the target value and the average value [TN] to thereby correct the rotational speed of the disk, and again the program returns to step 27, where the rotational speed of the disk is corrected so that the average value of the horizontal synchronizing period is within, the range of the reference values Ta and Tb.

When the program has proceeded from step 29 to step 31, the internal counter N indicating 525 horizontal synchronizing periods is first preset to N=1 at step 31, and then the data T1 of the horizontal synchronizing period corresponding to N=1 is taken out of the internal memory. At the next step 32, whether the data TN taken out on the basis of the counter N is within a range greater than a predetermined reference value Tc and less than a predetermined reference value Td is checked, and if it is within this range, the internal counter N is incremented at step 34 and thereafter, similar processing is repeated until N=526 at step 35. Ta, Tb, Tc, Td and To are in the relation that $Tc < Ta < To < Tb < Td$.

On the other hand, when at least one data is outside the range of Tc and Td, at step 33, the correction data which provides the irregularity of rotation corresponding to each horizontal synchronizing period to be put out to the D/A converter 19 is calculated from TN (N=1−525) as by Fourier conversion or reverse Fourier conversion by the use of the transfer function, and the correction data are respectively added to the average value TN calculated at step 29 and the sum is stored in the internal memory and is put out as control data to the D/A converter 19 for each horizontal synchronizing period. Therefore, even if there is any irregularity of rotation during recording, the speed control for re-creating the same irregularity of rotation as that during recording is effected during reproduction, whereby the influence of the irregularity of rotation during recording upon the reproduced image can be prevented. The disk is always rotated during steps 26 to 35.

Further, the speed reference for re-creating the irregularity of rotation during recording is determined from the interval of the reproduced horizontal synchronizing signal and the rotation of the disk is controlled by an open loop conforming to this speed reference and therefore, even irregularity of rotation of a high frequency can be faithfully re-creating independently of the transfer function of the disk driving system.

What is claimed is:

1. In an apparatus that repeatedly reproduces a picture signal from a motor-driven disk, the improvement comprising:
   (a) separating means for successively producing horizontal synchronizing signals separated from the reproduced picture signal;
   (b) memory means;
   (c) measuring means for measuring time intervals at which said horizontal synchronizing signals are produced by said separating means, outputting time-interval data indicative of a plurality of measured time intervals, and sotring in said memory means time-interval data corresponding to at least one field of the picture signal;
   (d) detecting menas for detecting that at least one of said time intervals is outside of a predetermined range, on the basis of said time-interval data stored in said memory means, and thereupon outputting a detection signal;
   (e) supplying menas for supplying voltage to control the rotation of said motor;
   (f) control means for controlling said supplying means to change said voltage; and
   (g) producing means responsive to said detection signal for producing control data which determine the change of said voltage during the reproduction of at least one field of the picture signal, on the basis of said time-interval data stored in said memory means and a transfer function, said producing means storing said control data in said memory means, said transfer function being defined by said measuring means, said supplying means and said motor;
   (h) said control means controlling said supplying means on the basis of said control data stored in said memory means to cause said time intervals to be within said predetermined range.

2. The improvement according to claim 1, wherein said producing means includes means for calculating the average value of said measured time intervals on the basis of said time-interval data stored in said memory means.

3. The improvement according to claim 2, wherein said producing means includes means for detecting that said average value is outside another predetermined range which is narrower than the first-mentioned predetermined range and outputting another detection signal.

4. The improvement according to claim 3, wherein said control means controls the rotation of said motor on the basis of a target value and said average value in response to said another detection signal.

5. The improvement according to claim 2, wherein said producing means calculates said controls data on the basis of said average value.

6. The improvement according to claim 1, wherein said control means controls said supplying means so that said supplying means supplies a fixed voltage to said motor until said detection signal is outputted.

7. A method for controlling an apparatus that repeatedly reproduces a picture signal from a motor-driven disk, comprising the steps of:
   (a) providing memory means;
   (b) providing supplying means for supplying voltage to control the rotation of said motor;
   (c) providing control means for controlling said supplying means to change said voltage;
   (d) successively producing horizontal synchronizing signals separated from the reproduced picture signal;
   (e) measuring time intervals at which said horizontal synchronizing signals are produced and outputting time-interval data indicative of a plurality of measured time intervals;
   (f) storing in said memory means time-interval data corresponding to at least one field of the picture signal;
   (g) producing control data which determine the change of said voltage during the reproduction of at least one field of the picture signal, on the basis of said time-interval data stored in said memory means, storing said control data in said memory means, and causing said control means to control said supplying means on the basis of said control data stored in said memory means; and (h) repeating the steps (d), (e), (f), and (g) until all of said measured time intervals are within a predetermined range.

8. A method according to claim 7, wherein step (h) comprising detecting whether any of said measured time intervals is outside said predetermined range, on the basis of said time-interval data stored in said memory means, and outputting a detection signal when any one of said measured time intervals is outside said predetermined range.

9. A method according to claim 8, wherein step (g) includes producing said control data in response to said detection signal.

10. A method according to claim 7, which comprises additional steps of:

calculating an average value of said measured time intervals in accordance with said time-interval data;

detecting that said average value is outside another predetermined range and thereupon outputting another detection signal.

11. In an apparatus that repeatedly reproduces a picture signal from a motor-driven disk, the improvement comprising:

(a) separating means for successively producing horizontal synchronizing signals separated from the reproduced picture signal;

(b) measuring means for measuring time intervals at which said horizontal synchronizing signals are produced by said separating means and outputting time-interval data indicative of a plurality of measured time-intervals;

(c) supplying means for supplying voltage for controlling said motor;

(d) control means for controlling said supplying means to change said voltage;

(e) memory means; and (f) producing means respnsive to a transfer function and to said time-interval data corresponding to at least one field of the picture signal for producing control data which determine the change of said voltage during the reproduction of at least one field of the picture signal, said producing means storing said control data in said memory means, said transfer function being defined by said measuring means, said motor and said supplying means;

(g) said control means controlling said supplying means so that said voltage changes during the reproduction of at lest one field of the picture signal in accordance with said control data stored in said memory means.

12. An apparatus according to claim 11, wherein said measuring means stores said time-interval data corresponding to at least one field of the picture signal in said memory means and said producing means produces said control data on the basis of said time-interval data stored in said memory means.

13. An apparatus according to claim 12, wherein said producing means calculates the average value of said measured time intervals on the basis of said time-interval data stored in said memory means and calculates said control data on the basis of said average value.

* * * * *